United States Patent Office

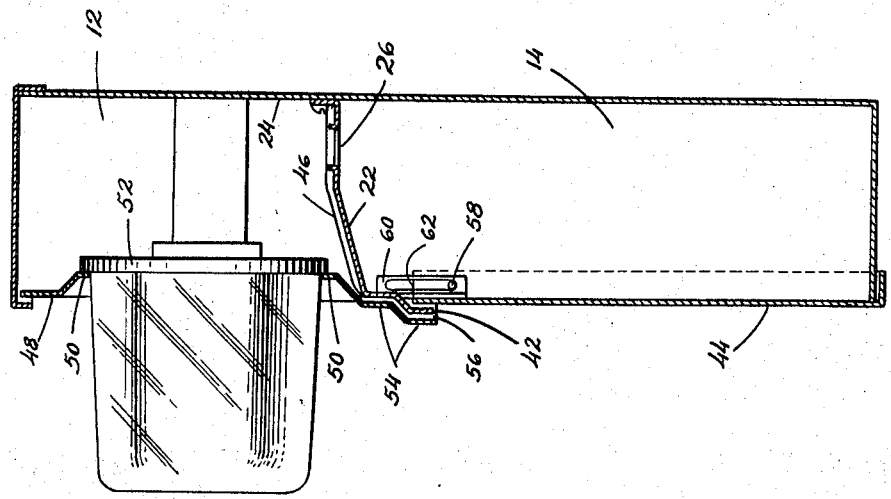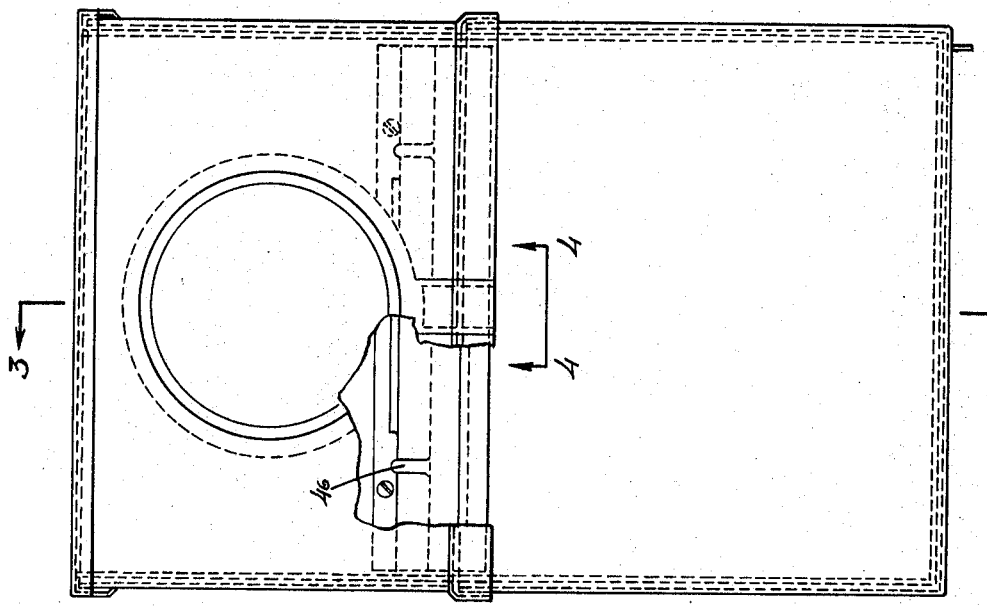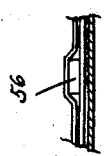
INVENTOR.
HERMAN H. KOBRYNER

3,526,813
Patented Sept. 1, 1970

3,526,813
WATERPROOF DOUBLE COMPARTMENT
OUTDOOR ELECTRIC METER HOUSING
Herman H. Kobryner, Forest Hills, N.Y., assignor to
Murray Manufacturing Corporation, Brooklyn, N.Y.,
a corporation of New York
Filed Jan. 3, 1969, Ser. No. 788,703
Int. Cl. H02b 1/12
U.S. Cl. 317—107                    6 Claims

ABSTRACT OF THE DISCLOSURE

An electric meter box is described of the outdoor ringless type wherein a second lower compartment is provided which is raintight. A water guidance discharge plate is employed which cooperates with a cover to provide a simple water discharge channel to prevent water from entering the lower compartment.

---

This invention relates to an electric meter box generally, and more specifically to an electric meter box of the outdoor, ringless type.

Electric meter boxes for holding electric power meters used with buildings are generally constructed in one of two ways. A first method of construction involves a meter box which employs a ring to produce what is called a "rain-tight" meter box. Such a rain-tight meter box maintains the components enclosed by the box completely dry when exposed to a rain test conducted as specified by general industrial requirements. In the latter meter box, no droplets of water are permitted to enter during the test. In a second meter box construction, an apertured cover plate is placed over the meter and a ring for obtaining complete rain-tightness is not employed. For the latter "outdoor" ringless type meter box, rain or water droplets are permitted to enter the meter compartment during a rain test conducted in accordance with well-known industrial standards.

In some meter box configurations, it is desirable to include a compartment for holding interconnecting circuit breakers to provide a simple, unified structure. Generally, it is preferred to place the circuit-breaker-containing compartment beneath the meter compartment since, as a practical matter, the A.C. line entering the meter compartment generally approaches it from above. It is further desirable to construct such a double compartment meter box with the lower cost ringless "outdoor" construction method, but in such case care must be taken to avoid the passage of water droplets into the lower compartment.

It is therefore an object of this invention to provide a double-compartment meter box of the ringless outdoor type where the lower compartment is rain-tight.

The above-mentioned and other features and objects of this invention and the manner of attaining them will become more apparent and the invention itself will best be understood by reference to the following description of an embodiment of the invention taken in conjunction with the accompanying drawings, the description of which follows:

FIG. 2 is a frontal view of a meter box in accordance with this invention;

FIG. 3 is a section view taken along the line 3—3 of FIG. 2; and

FIG. 4 is an end view taken along the line 4—4 of FIG. 2.

Figure 1:
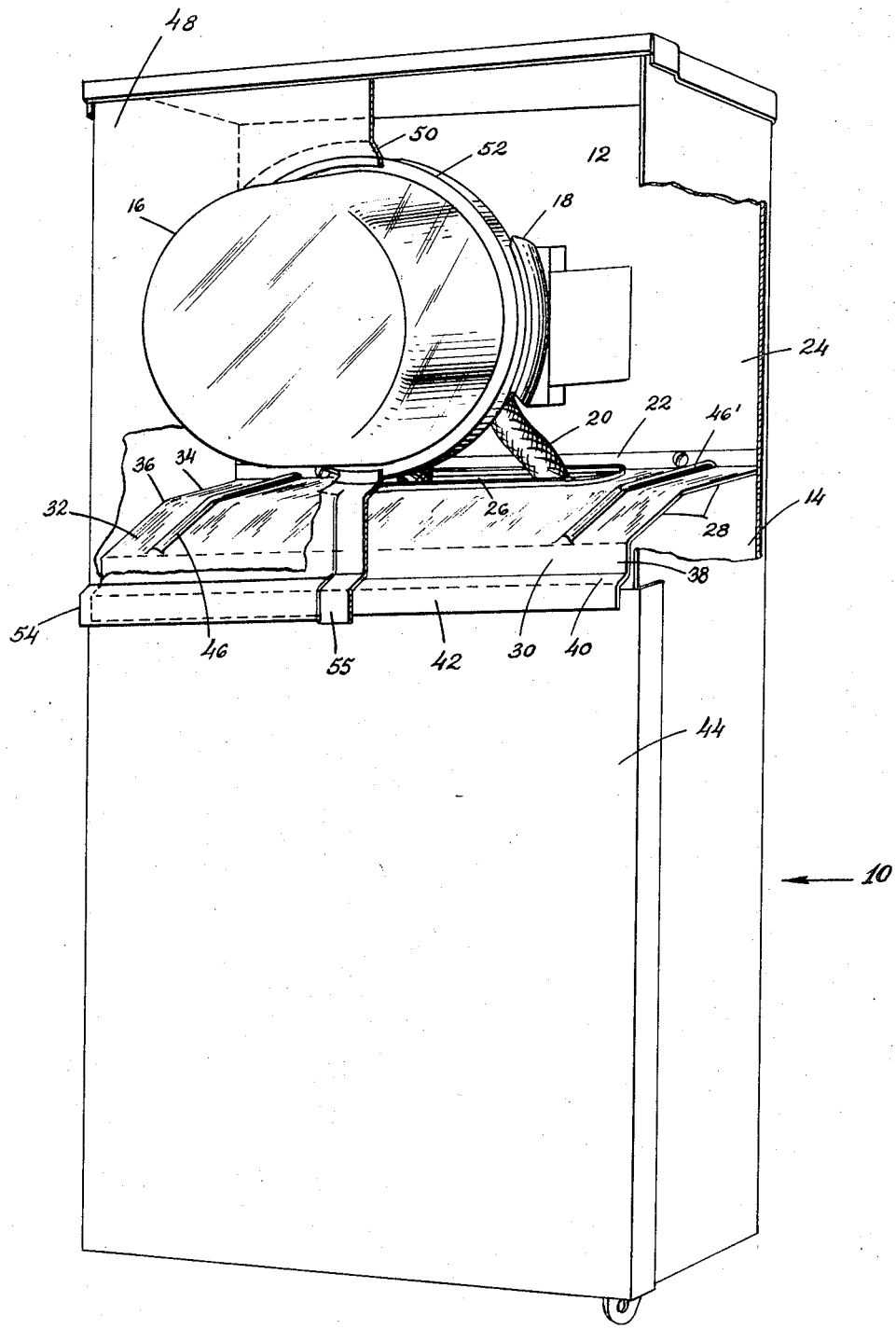
FIG. 1 is a perspective partially broken view of a double compartment meter box in accordance with this invention.

Briefly stated, my invention contemplates the formation of a double-compartment electric meter box of the ringless, outdoor type wherein a special water droplet guidance plate is provided and selectively shaped to assure the passage of droplets from the upper compartment to outside of the meter box to thereby provide a rain-tight lower compartment which may be used to mount circuit breakers and the like.

In FIG. 1, a housing generally indicated at 10 is formed having an upper compartment 12 and a lower compartment 14 located beneath the upper compartment 12. A conventional electric meter 16 is mounted in the upper compartment 12 and has the customary contacts which mate with suitable clamping posts, not visible in the view of FIG. 1. The meter 16 seats on angularly distributed seats such as 18. Cabling such as 20 connects the meter contacts with electrical circuitry located in the lower compartment 14. Below the meter 16 is a water guiding plate 22 which is mounted by either spot welding or screws to the rear wall 24 of the upper compartment 12. The water guiding plate 22 has an aperture 26 adjacent the rear wall 24 to permit passage of the cabling 20 from the upper compartment 12 to the lower compartment 14. The water guiding plate 22 is formed of a slanted upper lip 28 and a downwardly extending lower lip 30. The upper lip portion of the plate 22 is formed of two surfaces 32 and 34 which interconnect along a bend as indicated at the corner 36. The lower lip is formed of a first downwardly extending edge 38, a downwardly slanting edge 40 and a second downwardly extending edge 42.

The downwardly slanting edge 40 has a sufficient width to raise the second downwardly extending edge 42 above the lower compartment 14 for a distance necessary to accommodate the lower compartment cover 44. The upper lip portion of the plate 22 in addition is provided with a pair of raised shoulders 46–46' which are spaced from one another by a distance which is at least as large as the diameter of the meter 16 so that any droplets forming within the compartment 12 may be collected by the plate 22 to be thereupon passed downwardly and outside of both meter compartments.

Note that an upper compartment cover 48 is provided which has an aperture sized to fit over the outer portion of the meter 16 and which further has a depressed rim 50 which seats on the meter ring 52, thus keeping the meter in place.

The meter cover 48 has a lower edge 54 which is raised at 55 to fit with clearance at least over a portion of the lower lip 30 of the plate 22. With specific reference to FIG. 3, the raised portion 55 of the lower edge 54 of the upper compartment cover plate 48 becomes clearly visible. Note that the raised edge 55 forms a water discharge channel 56 with the second downwardly extending edge 42. The water discharge channel 56 communicates with the upper compartment 12 and terminates outside the housing 10. Any water entering the upper compartment 12 through for instance the seam formed between the rim 50 and the meter rim 52 has a free discharge path through the channel 56 and cannot pass into the lower compartment 14. FIG. 4 is illustrative of the cross-sectional size of the water discharge channel 56.

It is to be further realized that the raised edge portion 55 of the upper compartment cover 48 may, if desired, extend for a much wider distance than as indicated in FIG. 3. On the other hand, since but few droplets of water are expected to enter the upper compartment 12, a small channel 56 suffices to pass the water to outside of the housing 10. Note further that the second downwardly extending edge 42 of the plate 22 extends downwardly for a selected distance necessary to provide overlapping coverage of the lower compartment cover 44 which fits underneath the edge 42.

In the embodiment, the plate 22 is shown connected to the rear wall 24 of the upper compartment 12. It is conceivable, however, that the plate 22 may be mounted to the side walls of the housing 10 since the plate 22 need not extend all the way to the back wall 24 to provide the desired water protection for the lower compartment. Such a variation is considered within the scope of this invention.

It thus may be appreciated that an outdoor ringless meter box may be conveniently provided with a rain-tight compartment by the addition of a water-guiding plate. Yet, the addition of a water-tight compartment does not in any way complicate the mounting of the meter, or the placement of covers. The lower compartment cover 44, for instance, is removable for installation and work on the lower compartment without disturbing the components in the upper compartment. The rain-tightness of the lower compartment is preserved regardless of the frequency of access required to the lower compartment.

The lower compartment cover is mounted to the housing 10 by the employment of a pair of slotted brackets 60-60' attached to the cover (only 60 being visible in FIG. 3) which slide along pins 58-58' (only 58 being visible in FIG. 3). Since the upper edge 62 of the cover 44 provides a water path into compartment 14, the edge 62 fits beneath the second downwardly extending edge 42. Thus a rain-tight lower compartment is obtained.

While the principles of the invention have been described in connection with specific apparatus, it is to be clearly understood that this description is made only by way of example and not as a limitation to the scope of the invention as set forth in the objects thereof and in the accompanying claims.

I claim:

1. An electrical meter box of the outdoor ringless type having an upper compartment for holding an electric meter on a socket and a lower compartment to be kept free from water droplets, comprising a housing having an upper meter-holding compartment for receiving an electric meter through an exposable frontal surface and a lower compartment having an exposable frontal surface and being located beneath the upper compartment, said upper compartment being provided along the lower end thereof adjacent the lower compartment with a water guiding plate, said plate having an upper lip downwardly slanted towards the frontal surface of the upper compartment and a lower lip downwardly extending for a selected distance over the frontal surface of the lower compartment, a lower compartment frontal surface cover shaped to fit between the lower lip of the slanted water guiding plate and the lower compartment, and an upper compartment cover sized to fit over a meter installed in the upper compartment and having a lower edge shaped to form a water discharge channel with the lower lip of the water guiding plate to pass water from the upper compartment to outside the meter box.

2. The device as recited in claim 1 wherein said channel is located generally midway of the water guiding plate and below the central lowest portion of the meter.

3. The device as recited in claim 1 wherein the upper lip of the water guiding plate is provided with a pair of raised shoulders extending from an inwardly located region to the lower lip and being spaced from one another a distance at least commensurate with that of the width of the electric meter to assure guidance of all water droplets towards the lower lip.

4. The device as recited in claim 1 wherein the water guiding plate upper lip is attached to the upper compartment at the rear wall thereof.

5. The device as recited in claim 4 wherein the upper lip is further provided with an aperture adjacent the rear wall of the upper compartment for cabling communication with the lower compartment.

6. The device as recited in claim 1 wherein the lower lip is formed of a first downwardly extending edge, an outwardly projecting slanted edge and a second downwardly extending edge, said slanted edge being sufficiently long to effectively space the second downwardly extending edge a sufficient distance from the frontal surface of the lower compartment and permit the lower compartment cover to fit therebeneath.

References Cited

UNITED STATES PATENTS 3,123,744  3/1964  Fisher _____ 317—104

LARAMIE E. ASKIN, Primary Examiner

G. P. TOLIN, Assistant Examiner